(12) United States Patent
Park et al.

(10) Patent No.: US 12,512,527 B2
(45) Date of Patent: Dec. 30, 2025

(54) BATTERY PACK AND DEVICE INCLUDING THE SAME

(71) Applicant: LG ENERGY SOLUTION, LTD., Seoul (KR)

(72) Inventors: Won Kyoung Park, Daejeon (KR); Junyeob Seong, Daejeon (KR); Honggoo Han, Daejeon (KR); Hyun Seop Yun, Daejeon (KR)

(73) Assignee: LG ENERGY SOLUTION, LTD., Seoul (KR)

( * ) Notice: Subject to any disclaimer, the term of this patent is extended or adjusted under 35 U.S.C. 154(b) by 608 days.

(21) Appl. No.: 17/919,716

(22) PCT Filed: Jul. 26, 2021

(86) PCT No.: PCT/KR2021/009644
§ 371 (c)(1),
(2) Date: Oct. 18, 2022

(87) PCT Pub. No.: WO2022/045596
PCT Pub. Date: Mar. 3, 2022

(65) Prior Publication Data
US 2023/0163376 A1   May 25, 2023

(30) Foreign Application Priority Data
Aug. 24, 2020  (KR) .................. 10-2020-0106097

(51) Int. Cl.
*H01M 10/613*      (2014.01)
*H01M 10/6551*     (2014.01)
(Continued)

(52) U.S. Cl.
CPC ..... *H01M 10/613* (2015.04); *H01M 10/6551* (2015.04); *H01M 50/204* (2021.01);
(Continued)

(58) Field of Classification Search
None
See application file for complete search history.

(56) References Cited

U.S. PATENT DOCUMENTS

2008/0090137 A1   4/2008   Buck et al.
2008/0193830 A1   8/2008   Buck et al.
(Continued)

FOREIGN PATENT DOCUMENTS

DE   102018206276 A1 * 10/2019 ........... F16K 31/002
EP   3 327 821 A1      5/2018
(Continued)

OTHER PUBLICATIONS

Translation of Gehrmann (DE-102018206276-A1) from Espacenet (Year: 2019).*
(Continued)

*Primary Examiner* — Jonathan G Leong
*Assistant Examiner* — Claire A Rutiser
(74) *Attorney, Agent, or Firm* — Birch, Stewart, Kolasch & Birch, LLP

(57) ABSTRACT

Discussed is a battery back that includes: a plurality of battery modules that includes a battery cell stack, a module frame for housing the battery cell stack, and a heat sink located under a bottom part of the module frame; a pack frame that houses the plurality of battery modules; and a refrigerant transfer bolt that fastens the bottom part of the module frame, the heat sink, and the pack frame, wherein the pack frame includes a pack refrigerant pipe for supplying and discharging refrigerant, wherein a connection pipe for connecting the pack refrigerant pipe and the heat sink is formed through the refrigerant transfer bolt, and wherein the refrigerant transfer bolt includes an opening/closing member that opens or cuts off the connection pipe in response to a temperature of the refrigerant.

17 Claims, 14 Drawing Sheets

(51) Int. Cl.
 *H01M 50/204* (2021.01)
 *H01M 50/264* (2021.01)

(52) U.S. Cl.
 CPC ...... *H01M 50/264* (2021.01); *H01M 2220/20* (2013.01); *H01M 2220/30* (2013.01)

(56) References Cited

U.S. PATENT DOCUMENTS

| | | | |
|---|---|---|---|
| 2009/0214941 | A1 | 8/2009 | Buck et al. |
| 2009/0325055 | A1* | 12/2009 | Koetting ............. H01M 10/613 429/120 |
| 2012/0107663 | A1 | 5/2012 | Burgers et al. |
| 2013/0177791 | A1 | 7/2013 | Takahashi et al. |
| 2018/0108958 | A1 | 4/2018 | Masias |
| 2018/0114961 | A1 | 4/2018 | Kim et al. |
| 2018/0151930 | A1* | 5/2018 | Kim ................. H01M 10/6554 |
| 2018/0366794 | A1 | 12/2018 | Kim et al. |
| 2019/0173064 | A1 | 6/2019 | Lee et al. |
| 2020/0067155 | A1 | 2/2020 | Hwang et al. |

FOREIGN PATENT DOCUMENTS

| | | |
|---|---|---|
| JP | 2008-300103 A | 12/2008 |
| JP | 2012-15391 A | 1/2012 |
| JP | 2013-16301 A | 1/2013 |
| JP | 2019-516225 A | 6/2019 |
| JP | 2019-115206 A | 7/2019 |
| JP | 2019-183973 A | 10/2019 |
| JP | 2020-43004 A | 3/2020 |
| KR | 10-2015-0034500 A | 4/2015 |
| KR | 10-1634947 B1 | 7/2016 |
| KR | 10-2020-0021608 A | 3/2020 |
| KR | 10-2020-0073721 A | 6/2020 |
| WO | WO 2012/042642 A1 | 4/2012 |

OTHER PUBLICATIONS

International Search Report for PCT/KR2021/009644 mailed on Nov. 9, 2021.
Extended European Search Report for European Application No. 21861895.7, dated Jan. 24, 2024.

* cited by examiner

[FIG. 1] - CONVENTIONAL ART
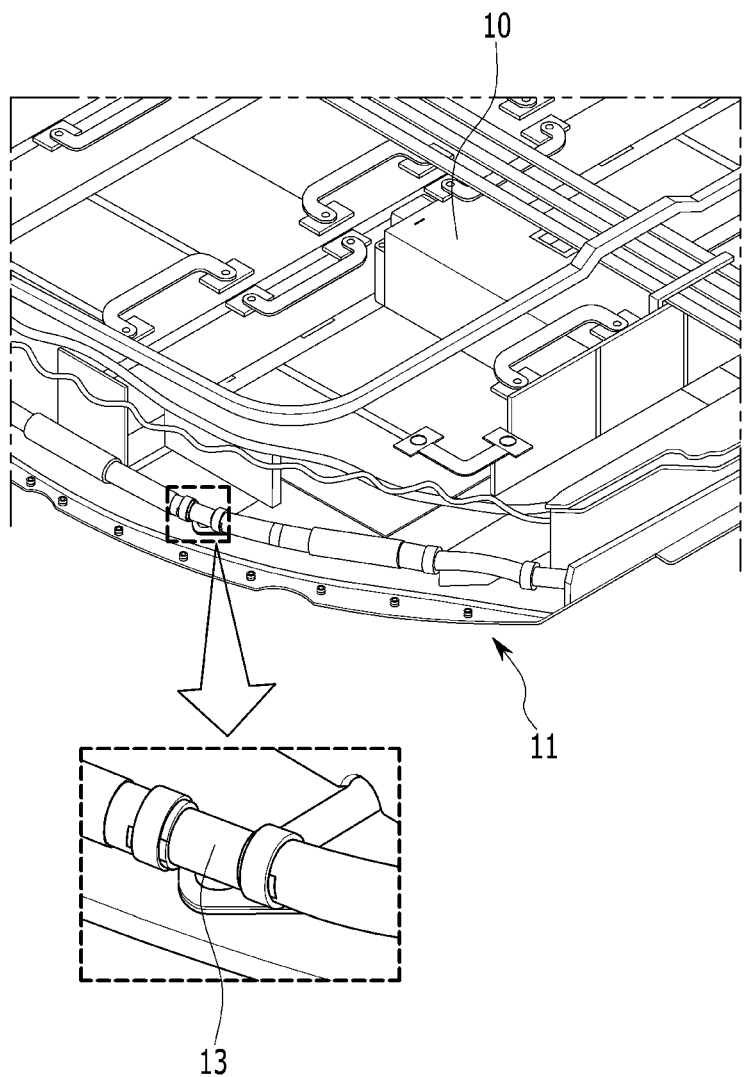

[FIG. 2]
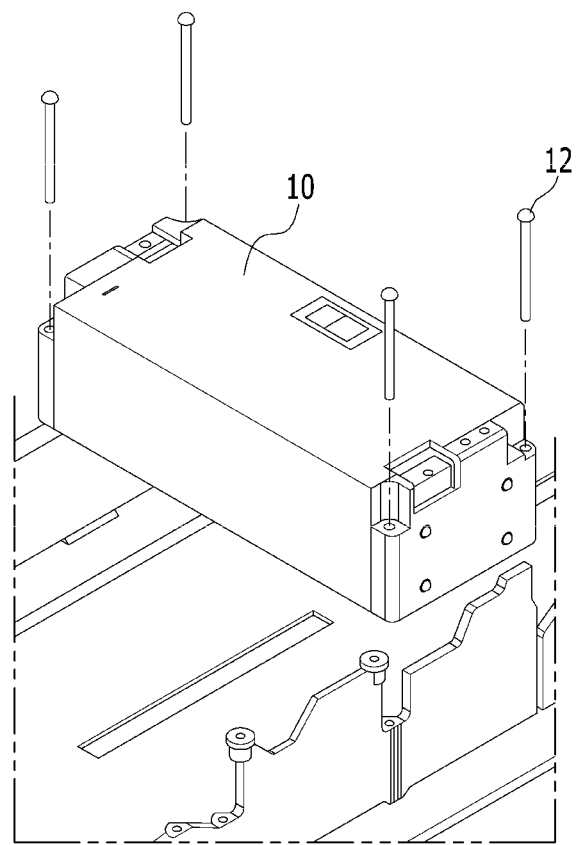

[FIG. 3]
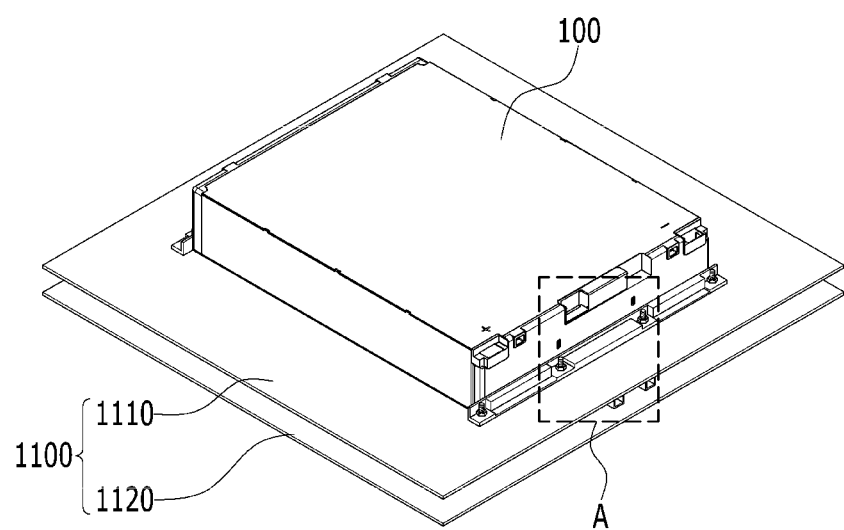

[FIG. 4]
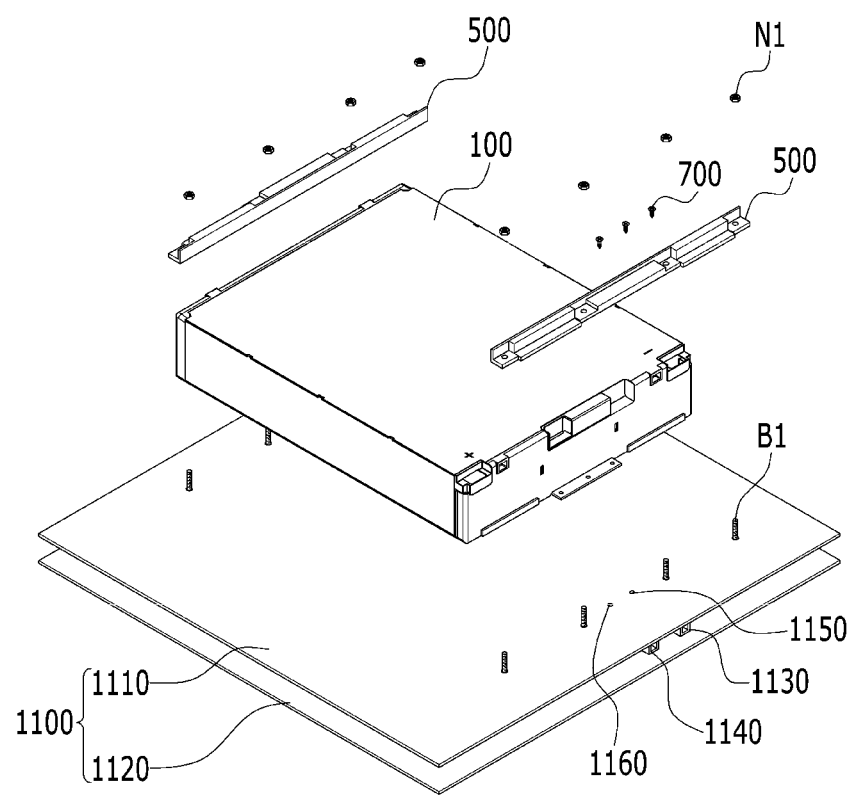

[FIG. 5]
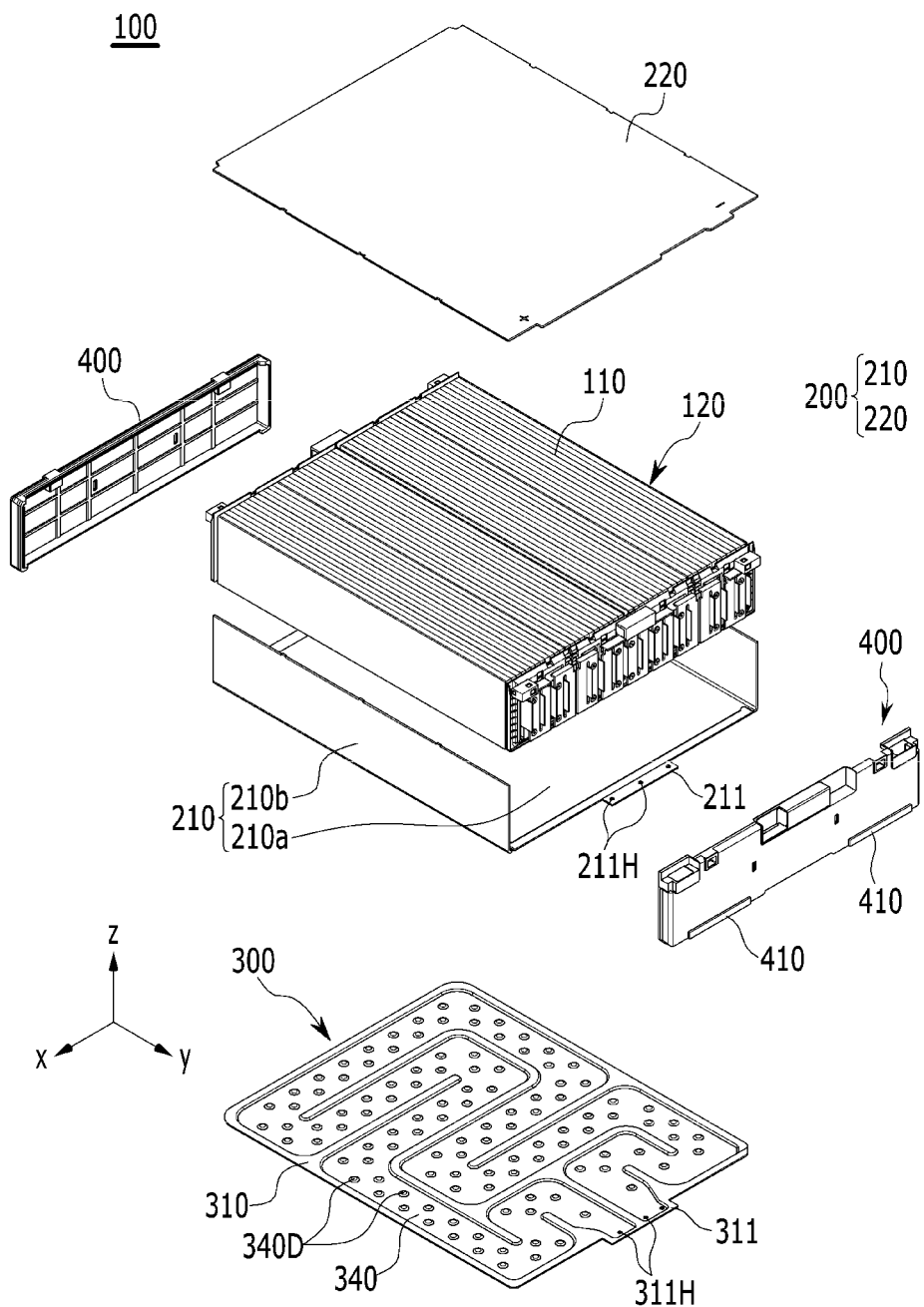

[FIG. 6]
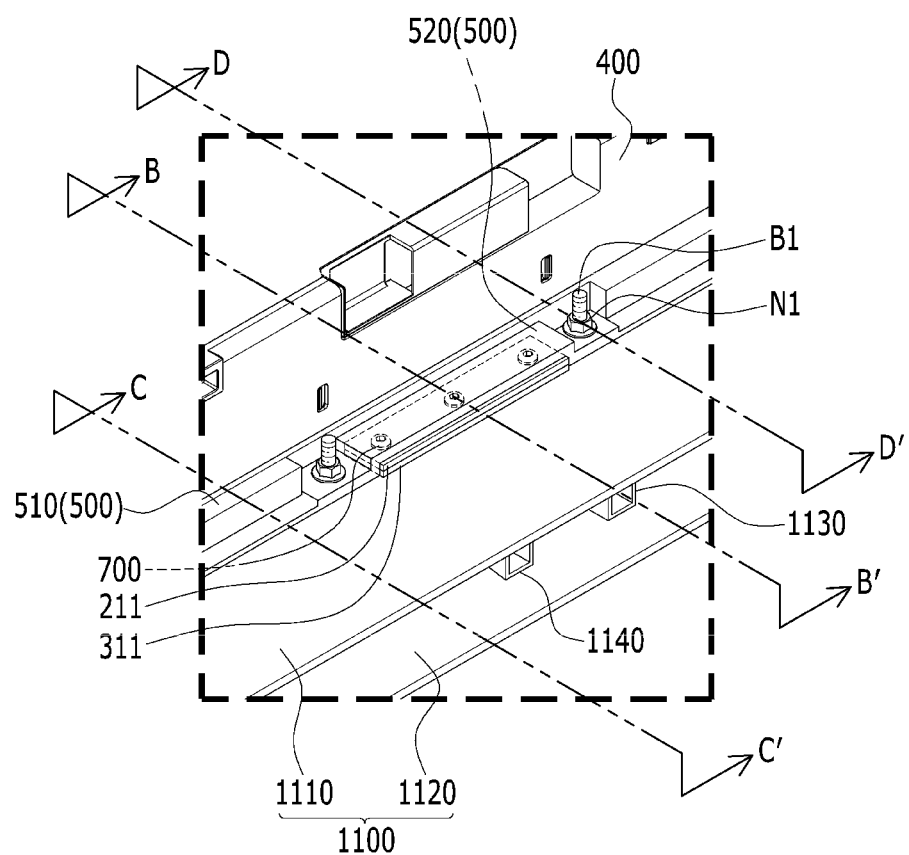

[FIG. 7]
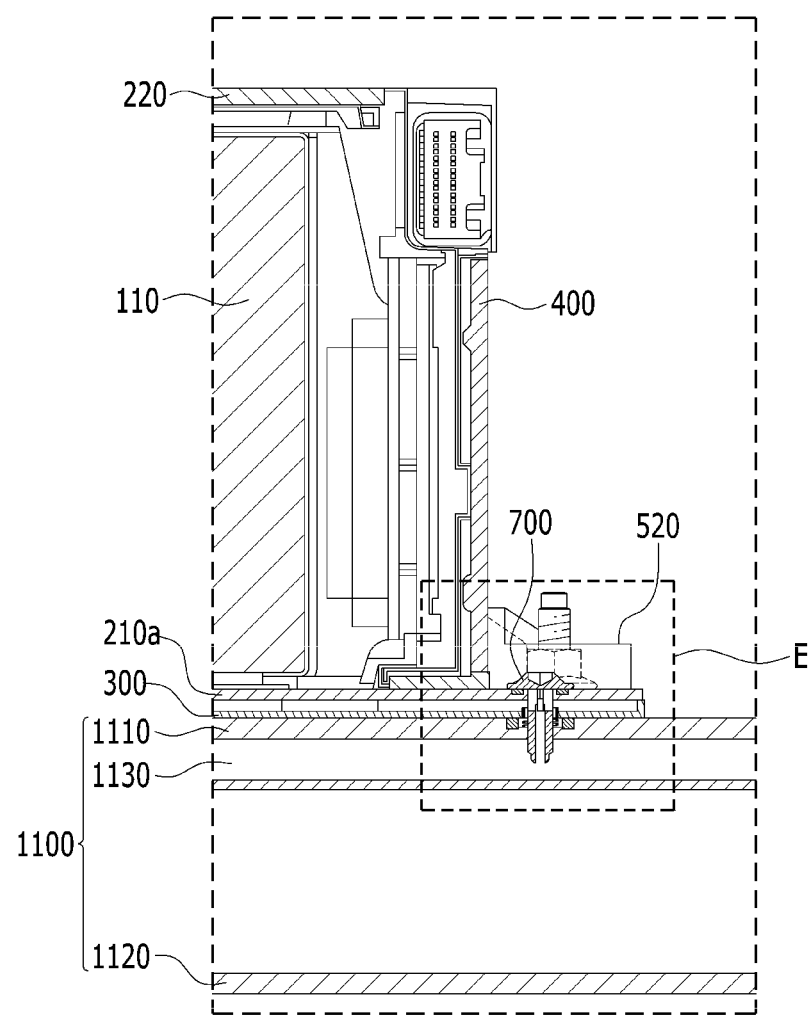

[FIG. 8]
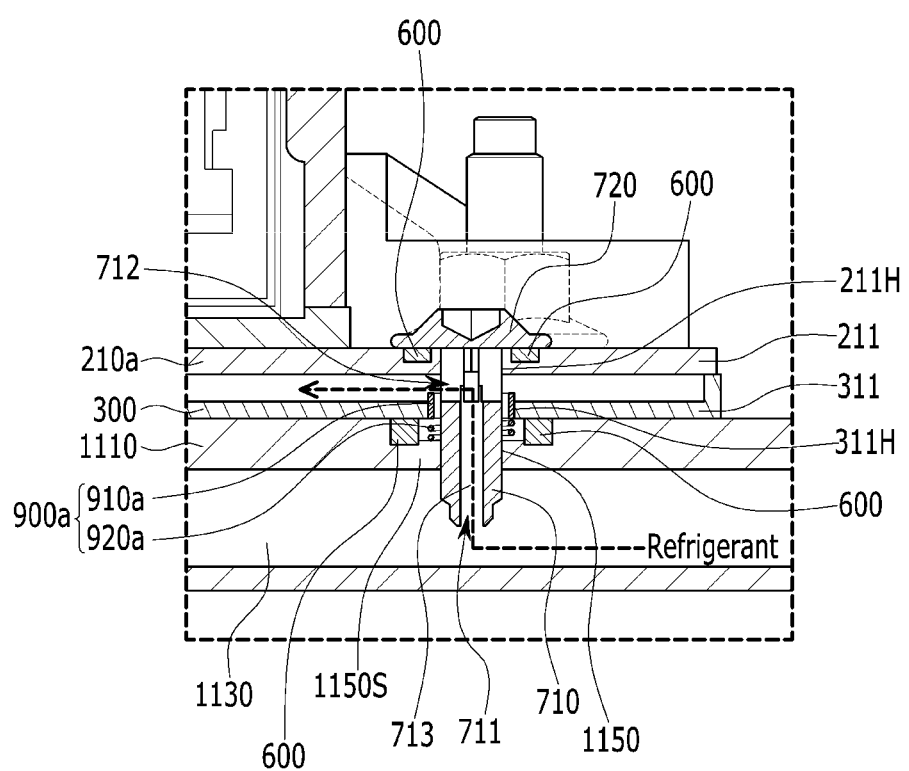

[FIG. 9]
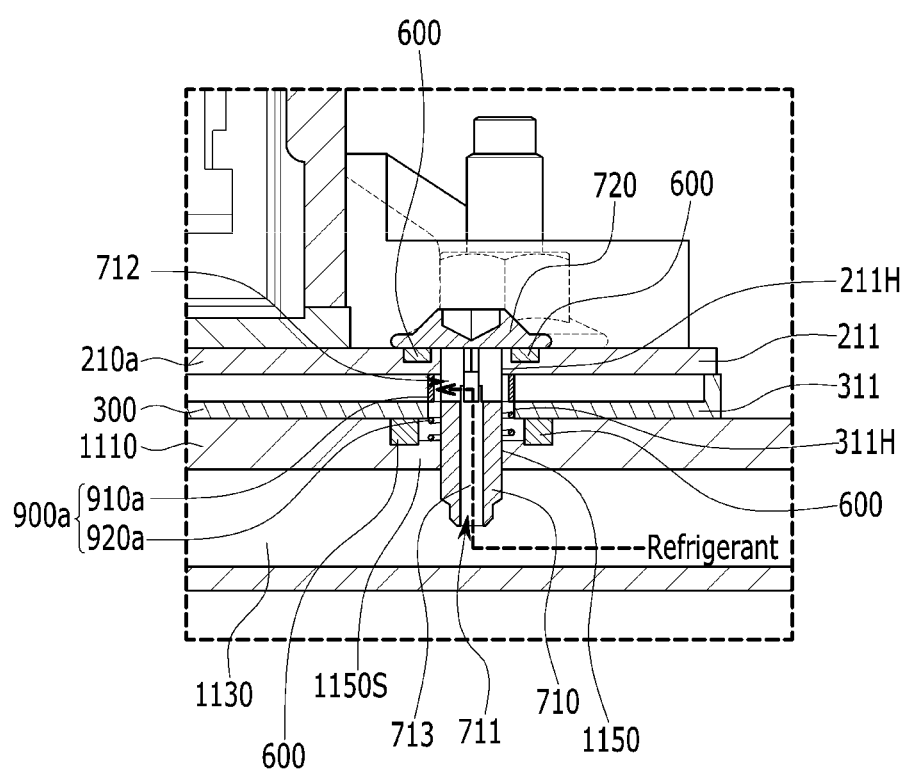

[FIG. 10]
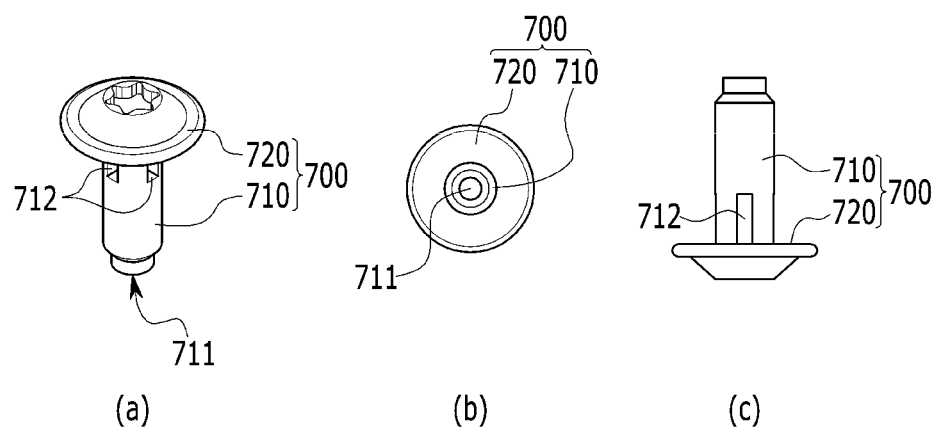

[FIG. 11]
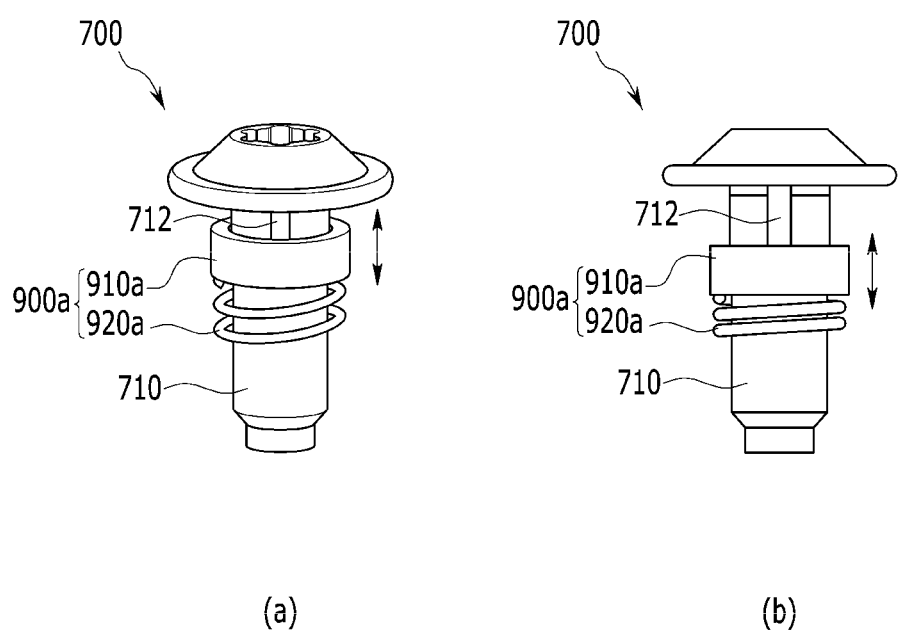
(a)  (b)

[FIG. 12]
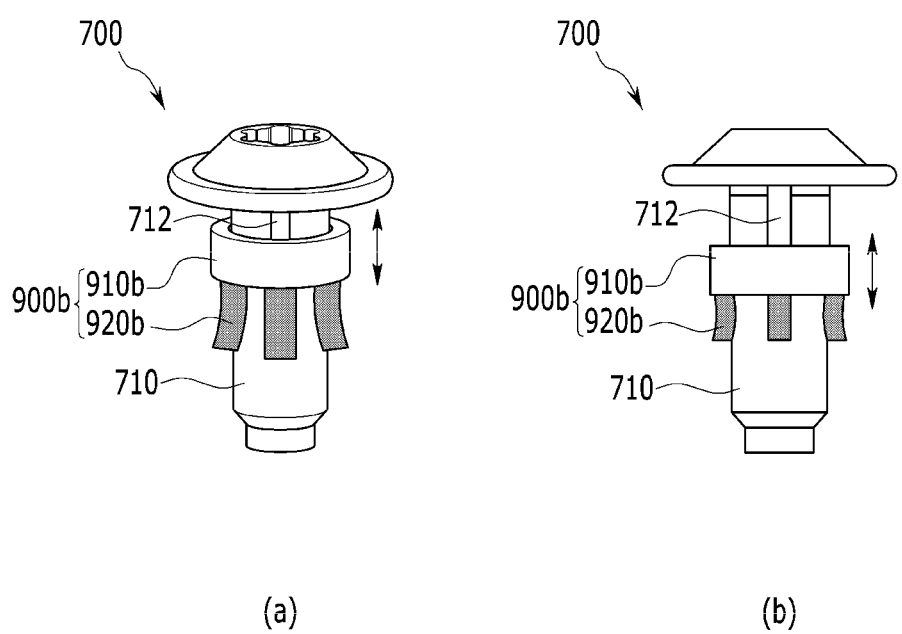
(a)     (b)

[FIG. 13]
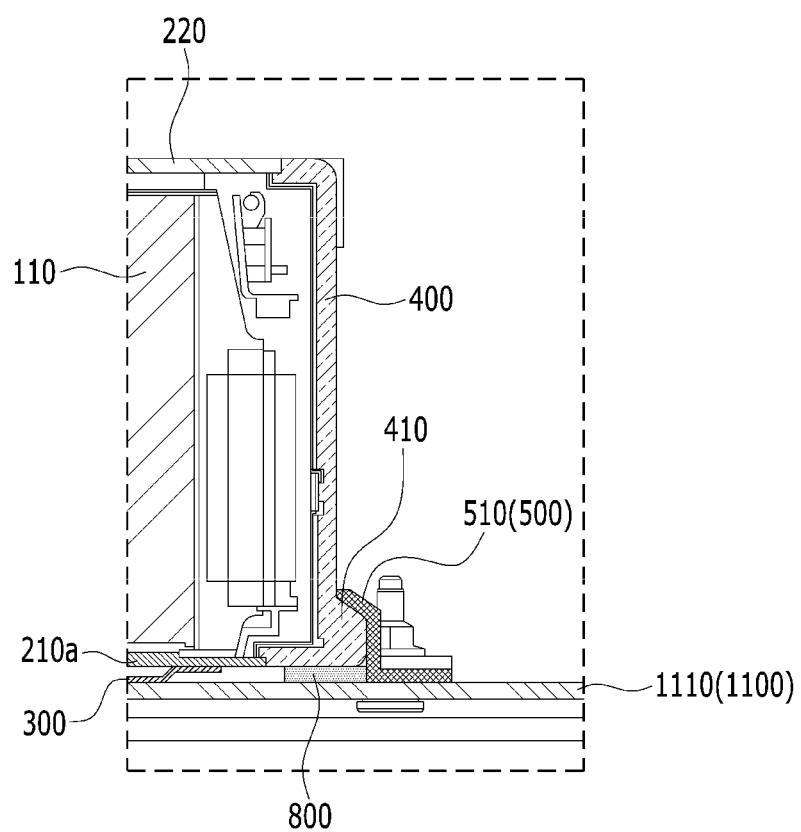

[FIG. 14]
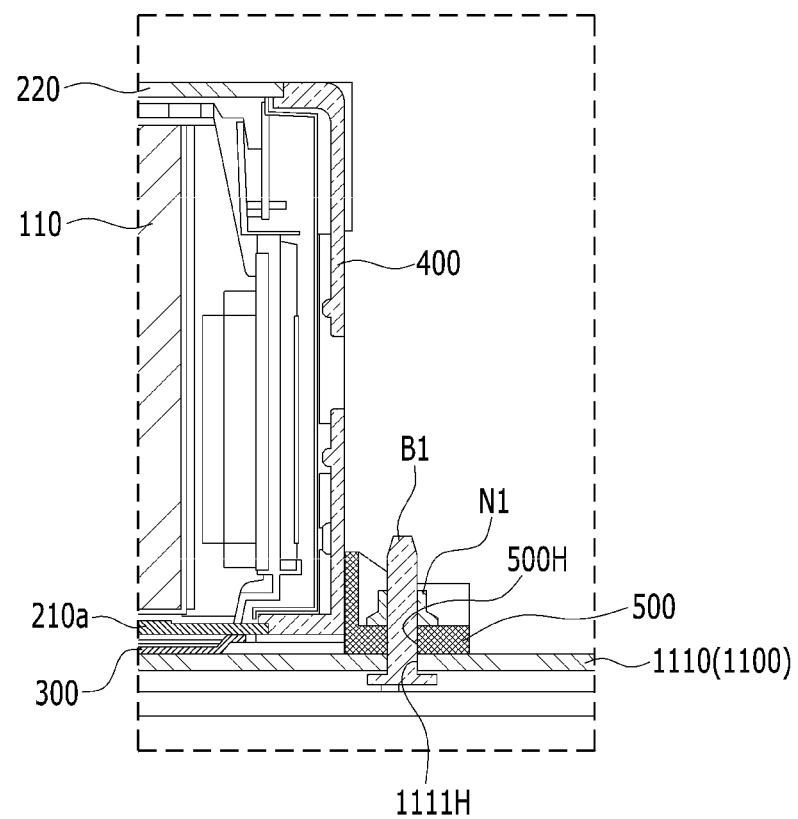

BATTERY PACK AND DEVICE INCLUDING THE SAME

CROSS CITATION WITH RELATED APPLICATION(S)

This application claims the benefit of Korean Patent Application No. 10-2020-0106097 filed on Aug. 24, 2020 with the Korean Intellectual Property Office, the disclosure of which is incorporated herein by reference in its entirety.

The present disclosure relates to a battery pack and a device including the same, and more particularly to a battery pack having improved cooling performance and safety, and a device including the same.

TECHNICAL FIELD

Background Art

In modern society, as portable devices such as a mobile phone, a notebook computer, a camcorder and a digital camera has been daily used, the development of technologies in the fields related to mobile devices as described above has been activated. In addition, chargeable/dischargeable secondary batteries are used as a power source for an electric vehicle (EV), a hybrid electric vehicle (HEV), a plug-in hybrid electric vehicle (P-HEV) and the like, in an attempt to solve air pollution and the like caused by existing gasoline vehicles using fossil fuel. Therefore, there is a growing need for development of the secondary battery.

Currently commercialized secondary batteries include a nickel cadmium battery, a nickel hydrogen battery, a nickel zinc battery, a lithium secondary battery, and the like. Among them, the lithium secondary battery has come into the spotlight because they have advantages over nickel-based secondary batteries, for example, hardly exhibiting memory effects and thus being freely charged and discharged, and having very low self-discharge rate and high energy density.

Such lithium secondary battery mainly uses a lithium-based oxide and a carbonaceous material as a positive electrode active material and a negative electrode active material, respectively. The lithium secondary battery includes an electrode assembly in which a positive electrode plate and a negative electrode plate each coated with the positive electrode active material and the negative electrode active material are disposed with a separator being interposed between them, and a battery case that seals and houses the electrode assembly together with an electrolyte solution.

Generally, the lithium secondary battery may be classified based on the shape of the exterior material into a can type secondary battery in which the electrode assembly is mounted in a metal can, and a pouch-type secondary battery in which the electrode assembly is mounted in a pouch of an aluminum laminate sheet.

In the case of a secondary battery used for small-sized devices, two to three battery cells are disposed, but in the case of a secondary battery used for a middle or large-sized device such as an automobile, a battery module in which a large number of battery cells are electrically connected is used. In such a battery module, a large number of battery cells are connected to each other in series or in parallel to form a cell stack, thereby improving capacity and output. In addition, one or more battery modules may be mounted together with various control and protection systems such as BMS (battery management system) and a cooling system to form a battery pack.

When the temperature of the secondary battery rises higher than an appropriate temperature, the performance of the secondary battery may be deteriorated, and in the worst case, there is also a risk of an explosion or ignition. In particular, a large number of secondary batteries, that is, a battery module or a battery pack having battery cells, can add up the heat generated from the large number of battery cells in a narrow space, so that the temperature can rise more quickly and excessively. In other words, a battery module in which a large number of battery cells are stacked, and a battery pack equipped with such a battery module can obtain high output, but it is not easy to remove heat generated from the battery cells during charging and discharging. When the heat dissipation of the battery cell is not properly performed, deterioration of the battery cells is accelerated, the lifespan is shortened, and the possibility of explosion or ignition increases.

Moreover, in the case of a middle or large-sized battery module included in a vehicle battery pack, it is frequently exposed to direct sunlight and can be subjected to high-temperature conditions such as summer or desert areas.

Therefore, when a battery module or a battery pack is configured, it may be very important to stably and effectively ensure the cooling performance.

FIG. 1 is a partial perspective view of a conventional battery pack, and FIG. 2 is a partial perspective view showing a method of mounting a battery module included in the battery pack of FIG. 1.

Referring to FIGS. 1 and 2, the conventional battery pack may include a plurality of battery modules 10 and a pack frame 11 in which the plurality of battery modules are housed. For convenience of explanation, only one battery module is shown in FIG. 1.

The conventional battery pack is provided with a refrigerant pipe for cooling the battery module 10, and the refrigerant is supplied via a refrigerant pipe connector 13 connected to the refrigerant pipe. This refrigerant is usually a cooling water, and a fluid indirect cooling structure is applied in which such cooling water is flowed inside the battery pack to lower the temperature.

Meanwhile, when the battery module 10 is housed in a pack frame 11, mounting holes are provided at four corners, and mounting bolts 12 may pass through the mounting holes and fasten to the pack frame 11. Such a mounting coupling may be formed for each battery module 10.

At this time, a cooling configuration such as a refrigerant pipe connector 13 for cooling the battery module 10 and a mounting configuration such as a mounting bolt 12 for mounting the battery module 10 are separate configurations, and there is a problem that each configuration has many parts and is complicated.

Due to assembly defects or accidents during operation, a situation may occur in which the refrigerant leaks from the refrigerant pipe, the refrigerant pipe connector 13, or the like, and the leaked refrigerant may penetrate the inside of the battery pack and cause a fire or explosion.

Therefore, there is a need to develop a battery pack that can minimize damage caused by refrigerant leakage while improving cooling performance.

DETAILED DESCRIPTION OF THE INVENTION

Technical Problem

It is an object of the present disclosure to provide a battery pack that can prevent damage caused by refrigerant leakage while improving cooling performance, and a device including the same.

However, the problem to be solved by embodiments of the present disclosure is not limited to the above-described problems, and can be variously expanded within the scope of the technical idea included in the present disclosure.

Technical Solution

According to one embodiment of the present disclosure, there is provided a battery pack comprising: a plurality of battery modules that includes a battery cell, a module frame for housing the battery cell stack, and a heat sink located under a bottom part of the module frame; a pack frame that houses the plurality of battery modules; and a refrigerant transfer bolt that fastens the bottom part of the module frame, the heat sink, and the pack frame, wherein the pack frame includes a pack refrigerant pipe for supplying and discharging refrigerant, wherein a connection pipe for connecting the pack refrigerant pipe and the heat sink is formed through the refrigerant transfer bolt, and wherein the refrigerant transfer bolt includes an opening/closing member that opens or cuts off the connection pipe in response to a temperature of the refrigerant.

The opening/closing member may include a shape memory alloy and deforms according to the temperature of the refrigerant.

The refrigerant transfer bolt may include a first opening and a second opening connected to the connection pipe, the first opening may be disposed inside the pack refrigerant pipe, and the second opening may be disposed between the bottom part of the module frame and the heat sink. The opening/closing member may adjust the opening/closing of the second opening in response to the temperature of the refrigerant.

The opening/closing member may include a cut-off part for opening or closing the connection pipe and a spring part connected to the cut-off part and including a shape memory alloy.

The spring part may be deformed in shape in response to the temperature of the refrigerant, and the cut-off part may move up and down according to the shape deformation of the spring part to open or cut off the connection pipe.

The spring part may be a coil-shaped spring or a plate-shaped spring.

A refrigerant opening may be formed in the pack frame, and the refrigerant opening may include a stepped part for supporting one end of the spring part.

The module frame may include a module frame extension part formed by extending a part of the bottom part of the module frame, the heat sink may include a heat sink extension part extending from one side of the heat sink to a portion where the module frame extension part is located, and the refrigerant transfer bolt may fasten the module frame extension part, the heat sink extension part, and the pack frame.

The refrigerant opening may be formed in the pack frame, a first mounting hole may be formed in the module frame extension part, and a second mounting hole may be formed in the heat sink extension part. The refrigerant transfer bolt may pass through the first mounting hole, the second mounting hole, and the refrigerant opening.

The refrigerant transfer bolt may include a first opening and a second opening connected to the connection pipe, the first opening may be disposed inside the pack refrigerant pipe, and the second opening may be disposed between the bottom part of the module frame and the heat sink. An opening direction of the first opening may be parallel to a penetrating direction of the connection pipe, and an opening direction of the second opening may be perpendicular to a penetrating direction of the connection pipe.

The refrigerant transfer bolt may include a body part in which the connection pipe is formed and a head part located at an upper end of the body part.

The battery pack may further include a gasket surrounding the body part, and the gasket may be located in at least one of between the head part and the module frame extension part formed by extending a part of the bottom part of the module frame and between the heat sink and the pack frame.

Protrusion parts may be formed on the front surface and rear surface of the battery module, respectively, and the battery pack may further include a fixing bracket that is located on the front surface and rear surface of the battery module, respectively, and is coupled to the pack frame while wrapping the protrusion part.

The pack frame may include a support frame for supporting the battery module and a lower frame located below the support frame, and the pack refrigerant pipe may be located between the support frame and the lower frame.

The battery pack may be included in a device, and the device may be one of an electronic device including a mobile phone, a notebook computer, and a camcorder, a digital camera, and a vehicle including an electric bike, an electric vehicle, and a hybrid electric vehicle.

The battery cell stack may include a plurality of battery cells that are stacked together.

Advantageous Effects

According to embodiments of the present disclosure, the mounting fixation and the pressure sealing can be performed at the same time through the refrigerant transfer bolt having the refrigerant flow path, thereby reducing the number of parts and simplifying the structure.

Further, the influence on the alignment between the through-holes required for supplying refrigerant can be minimized, thereby reducing the possibility of refrigerant leakage.

Further, the opening/closing member is disposed, so that the opening/closing of the connection pipe formed in the refrigerant transfer bolt can be actively adjusted according to the temperature of the refrigerant.

In addition, through the improved fixing bracket structure, the battery module can be firmly fixed and at the same time, damage caused by the refrigerant leakage can be effectively prevented.

The effects of the present disclosure are not limited to the effects mentioned above and additional other effects not described above will be clearly understood from the description of the appended claims by those skilled in the art.

BRIEF DESCRIPTION OF THE DRAWINGS

FIG. 1 is a partial perspective view of a conventional battery pack;

FIG. 2 is a partial perspective view showing a method of mounting a battery module included in the battery pack of FIG. 1;

FIG. 3 is a perspective view showing a battery module and a pack frame included in a battery pack according to an embodiment of the present disclosure;

FIG. 4 is an exploded perspective view showing a fixing bracket for fixing the battery module of FIG. 3 to the pack frame;

FIG. 5 is an exploded perspective view of the battery module of FIG. 3;

FIG. 6 is a partial perspective view showing a section "A" of FIG. 3 in an enlarged manner;

FIG. 7 is a partial cross-sectional view of a cross-section taken along the cutting line B-B' of FIG. 6;

FIGS. 8 and 9 are partial perspective views showing a section "E" of FIG. 7 in an enlarged manner;

FIG. 10, including (a), (b) and (c) are views of the refrigerant transfer bolt according to an embodiment of the present disclosure as viewed from various angles;

FIG. 11, including (a) and (b) are views of a refrigerant transfer bolt and an opening/closing member according to an embodiment of the present disclosure as viewed from various angles;

FIG. 12, including (a) and (b) are views of a refrigerant transfer bolt and an opening/closing member according to a modified embodiment of the present disclosure as viewed from various angles;

FIG. 13 is a partial cross-sectional view taken along the cutting line C-C' of FIG. 6; and FIG. 14 is a partial cross-sectional view of a cross-section taken along the cutting line D-D' of FIG. 6.

DETAILED DESCRIPTION OF THE EMBODIMENTS

Hereinafter, various embodiments of the present disclosure will be described in detail with reference to the accompanying drawings so that those skilled in the art can easily carry out them. The present disclosure may be modified in various different ways, and is not limited to the embodiments set forth herein.

A description of parts not related to the description will be omitted herein for clarity, and like reference numerals designate like elements throughout the description.

Further, in the drawings, the size and thickness of each element are arbitrarily illustrated for convenience of description, and the present disclosure is not necessarily limited to those illustrated in the drawings. In the drawings, the thickness of layers, regions, etc. are exaggerated for clarity. In the drawings, for convenience of description, the thicknesses of some layers and regions are exaggerated.

In addition, it will be understood that when an element such as a layer, film, region, or plate is referred to as being "on" or "above" another element, it can be directly on the other element or intervening elements may also be present. In contrast, when an element is referred to as being "directly on" another element, it means that other intervening elements are not present. Further, the word "on" or "above" means disposed on or below a reference portion, and does not necessarily mean being disposed on the upper end of the reference portion toward the opposite direction of gravity.

Further, throughout the description, when a portion is referred to as "including" a certain component, it means that the portion can further include other components, without excluding the other components, unless otherwise stated.

Further, throughout the description, when referred to as "planar", it means when a target portion is viewed from the upper side, and when referred to as "cross-sectional", it means when a target portion is viewed from the side of a cross section cut vertically.

FIG. 3 is a perspective view showing a battery module and a pack frame included in a battery pack according to an embodiment of the present disclosure. FIG. 4 is an exploded perspective view showing a fixing bracket for fixing the battery module of FIG. 3 to the pack frame. FIG. 5 is an exploded perspective view of the battery module of FIG. 3.

Referring to FIGS. 3 to 5, a battery pack according to an embodiment of the present disclosure includes a plurality of battery modules 100, a pack frame 1100 for housing the plurality of battery modules 100 and a refrigerant transfer bolt. The battery modules 100 includes a battery cell stack 120 in which a plurality of battery cells 110 are stacked, a module frame 200 for housing the battery cell stack 120, and a heat sink 300 located under a bottom part 210*a* of the module frame 200. The refrigerant transfer bolt will be described later.

The battery cell 110 may be a pouch-type battery cell. The pouch-type battery cell may be formed by housing an electrode assembly in a pouch case of a laminate sheet including a resin layer and a metal layer, and then heat-sealing an outer peripheral part of the pouch case. At this time, the battery cell 110 may be formed in a rectangular sheet-like structure.

Such battery cells 110 may be configured by a plurality of numbers, and the plurality of battery cells 110 are stacked so as to be electrically connected to each other, thereby forming a battery cell stack 120. In particular, as shown in FIG. 5, a plurality of battery cells 110 may be stacked along a direction parallel to the x-axis.

The battery cell stack 120 according to the present embodiment may be a large-area module in which the number of battery cells 110 is increased compared to a conventional case. Specifically, 32 to 48 battery cells 110 may be included per battery module 100. In the case of such a large-area module, the horizontal length of the battery module becomes long. Here, the horizontal length may mean a length in the direction in which the battery cells 110 are stacked, that is, in a direction parallel to the x-axis.

The module frame 200 for housing the battery cell stack 120 may include an upper cover 220 and a U-shaped frame 210.

The U-shaped frame 210 may include a bottom part 210*a* and two side surface parts 210*b* extending upward from both ends of the bottom part 210*a*. The bottom part 210*a* may cover the lower surface (−z-axis direction) of the battery cell stack 120, and the side surface parts 210*b* may cover both side surfaces (x-axis direction and −x-axis direction) of the battery cell stack 120.

The upper cover 220 may be formed in a single plate-shaped structure that wraps the remaining upper surface (z-axis direction) excluding the lower surface and the both side surfaces wrapped by the U-shaped frame 210. The upper cover 220 and the U-shaped frame 210 can be joined by welding or the like in a state in which the corresponding corner portions are in contact with each other, thereby forming a structure that covers the battery cell stack 120 vertically and horizontally. The battery cell stack 120 can be physically protected through the upper cover 220 and the U-shaped frame 210. For this purpose, the upper cover 220 and the U-shaped frame 210 may include a metal material having a predetermined strength.

Meanwhile, although not specifically shown in the figure, the module frame 200 according to a modified embodiment may be a mono frame in the form of a metal plate in which the upper surface, the lower surface, and both side surfaces are integrated. That is, this is not a structure in which the U-shaped frame 210 and the upper cover 220 are coupled with each other, but a structure in which the upper surface, the lower surface, and both side surfaces are integrated by being manufactured by extrusion molding.

The end plate 400 may be located on the front surface and rear surface (y-axis and −y-axis directions) of the battery cell stack 120, so that it may be formed so as to cover the battery cell stack 120. The end plate 400 can physically protect the battery cell stack 120 and other electronic instruments from external impact.

Meanwhile, although not specifically shown in the figure, a busbar frame mounted with a busbar, an insulating cover for electrical insulation, and the like may be located between the battery cell stack 120 and the end plate 400.

Meanwhile, the battery module 100 according to the present embodiment includes a heat sink 300 located below the bottom part 210a of the module frame 200. The bottom part 210a of the module frame 200 may constitute an upper plate of the heat sink 300, and a recessed part 340 of the heat sink 300 and the bottom part 210a of the module frame 200 may form a flow passage for refrigerant.

Specifically, the heat sink 300 may include a lower plate 310 that forms a skeleton of the heat sink 300 and is directly joined by welding or the like with the bottom part 210a of the module frame 200, and a recessed part 340, which is a path through which the refrigerant flows.

The recessed part 340 of the heat sink 300 corresponds to a portion in which the lower plate 310 is formed to be recessed on the lower side. The recessed part 340 may be a U-shaped pipe in which a cross section cut in the xz plane perpendicularly to the direction in which the refrigerant flow passage extends has U-shape, and the bottom part 210a may be located on the opened upper side of the U-shaped pipe. While the heat sink 300 comes into contact with the bottom part 210a, the space between the recessed part 340 and the bottom part 210a forms a region through which the refrigerant flows, that is, a refrigerant flow path. Thereby, the bottom part 210a of the module frame 200 can come into contact with the refrigerant.

The method of manufacturing the recessed part 340 of the heat sink 300 is not particularly limited, but a U-shaped recessed part 340 with an opened upper side can be formed by providing a structure formed by being recessed with respect to a plate-shaped heat sink 300.

Meanwhile, although not shown in the figure, a thermal conductive resin layer including a thermal conductive resin may be located between the bottom part 210a of the module frame 200 of FIG. 5 and the battery cell stack 120. The thermal conductive resin layer may be formed by applying a thermal conductive resin to the bottom part 210a, and curing the applied thermal conductive resin.

The thermal conductive resin may include a thermal conductive adhesive material, and specifically, may include at least one of silicone material, urethane material, and acrylic material. The thermal conductive resin is a liquid during application but is cured after application, so that it can perform the role of fixing one or more battery cells 110 constituting the battery cell stack 120. Further, since the thermal conductive resin has excellent heat transfer properties, heat generated from the battery cell 110 can be quickly transferred to the lower side of the battery module.

The battery module 100 according to the present embodiment can realize an integrated type cooling structure of the module frame 200 and the heat sink 300, thereby further improving the cooling performance. The bottom part 210a of the module frame 200 can perform the role of corresponding to the upper plate of the heat sink 300, thereby realizing the integrated type cooling structure. The cooling efficiency due to direct cooling can be increased, and through a structure in which the heat sink 300 is integrated with the bottom part 210a of the module frame 200, the space utilization rate on the battery module and the battery pack equipped with the battery module can be further improved.

Specifically, heat generated from the battery cell 110 can pass through a thermal conductive resin layer (not shown) located between the battery cell stack 120 and the bottom part 210a, the bottom part 210a of the module frame 200 and the refrigerant, and then can be transferred to the outside of the battery module 100. By removing the unnecessary cooling structure according to the conventional one, the heat transfer path can be simplified and an air gap between respective layers can be reduced, so that the cooling efficiency or performance can be enhanced. In particular, since the bottom part 210a is configured as an upper plate of the heat sink 300 and the bottom part 210a comes into contact with the refrigerant, there is an advantage that more direct cooling through the refrigerant can be performed.

Further, through the removal of the unnecessary cooling structure, the height of the battery module 100 is reduced and thus, the cost can be reduced and space utilization rate can be increased. Furthermore, since the battery module 100 can be disposed in a compact manner, the capacity or output of the battery pack 1000 including a plurality of battery modules 100 can be increased.

Meanwhile, the bottom part 210a of the module frame 200 can be joined by welding to a portion of the lower plate 310 in which the recessed part 340 is not formed among the heat sink 300. In the present embodiment, through the integrated type cooling structure of the bottom part 210a of the module frame 200 and the heat sink 300, it can exhibit the effects of not only improving the cooling performance described above, but also supporting the load of the battery cell stack 120 housed in the module frame 200 and reinforcing the rigidity of the battery module 100. In addition, the lower plate 310 and the bottom part 210a of the module frame 200 are sealed by welding or the like, so that the refrigerant can flow without leakage in the recessed part 340 formed inside the lower plate 310.

For effective cooling, as shown in FIG. 5, the recessed part 340 is preferably formed over the entire region corresponding to the bottom part 210a of the module frame 200. For this purpose, the recessed part 340 can be curved at least one time to connect from one side to another side. In particular, the recessed part 340 is preferably curved several times so that the recessed part 340 is formed over the entire region corresponding to the bottom part 210a of the module frame 200. As the refrigerant moves from the start point to the end point of the refrigerant flow passage formed over the entire region corresponding to the bottom part 210a of the module frame 200, efficient cooling can be performed over the entire region of the battery cell stack 120.

Meanwhile, the refrigerant is a medium for cooling and is not particularly limited, but it may be a cooling water.

Meanwhile, a protrusion pattern 340D may be formed in the recessed part 340 of the heat sink 300 according to the present embodiment. In the case of a large-area battery module in which as in the battery cell stack 120 according to the present embodiment, the number of stacked battery cells is increased significantly compared to a conventional case, the width of the refrigerant flow passage may be formed wider and thus, a temperature deviation can be more severe. In the large-area battery module, it may include a case in which approximately 32 to 48 battery cells are stacked in one battery module, compared to a conventional case in which approximately 12 to 24 battery cells are stacked in one battery module. In this case, the protrusion pattern 340D according to the present embodiment can exhibit the effect of substantially reducing the width of the refrigerant flow passage, so that the pressure drop can be minimized and at the same time, the temperature deviation between the widths of the refrigerant flow path can be reduced. Therefore, a uniform cooling effect can be realized.

Next, the fastening through the refrigerant transfer bolt will be described in detail with reference to FIGS. 6 and 7.

FIG. 6 is a partial perspective view showing a section "A" of FIG. 3 in an enlarged manner. FIG. 7 is a partial cross-sectional view of a cross-section taken along the cutting line B-B' of FIG. 6.

Referring to FIGS. 4 to 7, the battery pack according to the present embodiment includes a bottom part 210*a* of the module frame 200, and a refrigerant transfer bolt 700 for fastening the heat sink 300 and the pack frame 1100.

A pack frame 1100 according to the present embodiment may include a pack refrigerant pipes 1130 and 1140 for suppling and discharging refrigerant, and refrigerant openings 1150 and 1160 formed in the pack refrigerant pipes 1130 and 1140. Specifically, the pack refrigerant pipes 1130 and 1140 may include a pack refrigerant supply pipe 1130 for supplying refrigerant and a pack refrigerant discharge pipe 1140 for discharging refrigerant. The refrigerant openings 1150 and 1160 may include a refrigerant supply opening 1150 connected to the pack refrigerant supply pipe 1130 and a refrigerant discharge opening 1160 connected to the pack refrigerant discharge pipe 1140.

The pack frame 1100 may include a support frame 1110 for supporting the battery module 100 and a lower frame 1120 located below the support frame 1110. The pack refrigerant supply pipe 1130 and the pack refrigerant discharge pipe 1140 may be located between the support frame 1110 and the lower frame 1120. In more detail, the pack refrigerant supply pipe 1130 and the pack refrigerant discharge pipe 1140 may be configured so as to be located directly below the support frame 1110 and integrated with the support frame 1110.

The module frame 200 according to the present embodiment may include a module frame extension part 211 formed by extending a part of the bottom part 210*a* of the module frame 200. Further, the heat sink 300 according to the present embodiment may include a heat sink extension part 311 extending from one side of the heat sink 300 to a portion where the module frame extension part 211 is located. The module frame extension part 211 and the heat sink extension part 311 may have shapes corresponding to each other, and may be extendedly formed so as to pass the end plate 400.

A first mounting hole 211H may be formed in the module frame extension part 211, and a second mounting hole 311H may be formed in the heat sink extension part 311.

The refrigerant transfer bolt 700 according to the present embodiment fastens the module frame extension part 211, the heat sink extension part 311, and the pack frame 1100. Specifically, the refrigerant transfer bolt 700 is sequentially passed through the first mounting hole 211H, the second mounting hole 311H, and the refrigerant supply opening 1150 of the pack frame 1100 and is fastened.

Next, the refrigerant transfer structure through the refrigerant transfer bolt will be described in detail with reference to FIGS. 8 to 11, and the like. Among the pack refrigerant pipes 1130 and 1140, the pack refrigerant supply pipe 1130 will be mainly described, but a refrigerant transfer structure through the refrigerant transfer bolt 700 may be similarly applied to the pack refrigerant discharge pipe 1140.

FIGS. 8 and 9 are partial perspective views showing a section "E" of FIG. 7 in an enlarged manner. FIGS. 10*a* to 10*c* are views of the refrigerant transfer bolt according to an embodiment of the present disclosure as viewed from various angles. FIGS. 11*a* and 11*b* are views of a refrigerant transfer bolt and an opening/closing member according to an embodiment of the present disclosure as viewed from various angles.

Specifically, FIG. 8 shows a state in which the refrigerant flow path is opened by the opening/closing member 900*a*, and FIG. 9 shows a state in which the refrigerant flow path is cut off by the opening/closing member 900*a*. Meanwhile, FIGS. 10*a* to 10*c* show the refrigerant transfer bolt 700 in a state in which the opening/closing member 900*a* is removed for convenience of explanation, wherein FIG. 10*a* is a perspective view of the refrigerant transfer bolt 700, FIG. 10*b* is a plan view of the refrigerant transfer bolt 700 of FIG. 10*a* as viewed from below, FIG. 10*c* is a side view viewed from the side after turning over the refrigerant transfer bolt 700 of FIG. 10*a*. Meanwhile, FIGS. 11*a* and 11*b* show a state in which the opening/closing member 900*a* is disposed on the refrigerant transfer bolt 700.

Referring to FIGS. 8 to 11, a connection pipe 713 for connecting the pack refrigerant pipes 1130 and 1140 and the heat sink 300 is formed in the refrigerant transfer bolt 700 according to the present embodiment, and the refrigerant transfer bolt 700 includes an opening/closing member 900*a* that opens or cuts off the connection pipe 713 in response to the temperature of the refrigerant. FIG. 8 shows a connection pipe 713 of the refrigerant transfer bolt 700 that connects the pack refrigerant supply pipe 1130 and the heat sink 300.

Specifically, the refrigerant transfer bolt 700 may include a body part 710 in which a connection pipe 713 is formed, and a head part 720 located at an upper end of the body part 710. Although the columnar structure having a diameter corresponding to the inner diameter of the first mounting hole 211H and the second mounting hole 311H of the body part 710 is not specifically shown, a screw thread can be formed on the outer peripheral surface. A screw thread may also be formed on the inner surface of the refrigerant supply opening 1150, so that the body 710 can be fastened to the pack frame 1100. The head part 720 is configured so as to have a larger diameter than the body part 710, and may bring the module frame extension part 211 and the heat sink extension part 311 into close contact with each other.

The refrigerant transfer bolt 700 may include a first opening 711 and a second opening 712 connected to the connection pipe 713 and formed in the body part 710. The first opening 711 may be disposed inside the pack refrigerant supply pipe 1130, and the second opening 712 may be disposed between the bottom part 210*a* of the module frame 200 and the heat sink 300. The opening direction of the first opening 711 may be parallel to the penetrating direction of the connection pipe 713, and the opening direction of the second opening 712 may be perpendicular to the penetrating direction of the connection pipe 713. The first opening 711 may be located at one end of the body part 710 while being connected to the connection pipe 713, and a plurality of second openings 712 may be formed along the outer peripheral surface of the body part 710 and may be connected to the connection pipe 713.

The refrigerant that has moved through the pack refrigerant supply pipe 1130 is sequentially passed through the first opening 711, the connection pipe 713, and the second opening 712 and is inflowed between the bottom part 210*a* and the heat sink 300. As described above, the inflowing refrigerant may move along the recessed part 340 of the heat sink 300 to cool the battery module 100.

The refrigerant transfer bolt 700 according to the present embodiment not only serves to mount and fix the module frame 200 and the heat sink 300 to the pack frame 1100 but also may function as a path for supplying a refrigerant to the lower end of the battery module 100. In addition, since the bottom part 210a, the heat sink 300 and the pack refrigerant supply pipe 1130 are strongly in close contact with each other by the fastening force of the refrigerant transfer bolt 700, the sealing property is improved, and the possibility of refrigerant leakage therebetween can be reduced. That is, since mounting fixation, pressure sealing and refrigerant transfer can be performed at the same time, it is possible to reduce the number of parts and simplify the structure. In addition, since the refrigerant supply opening 1150 and the second mounting hole 311H are inevitably aligned by the refrigerant transfer bolt 700, the influence on the alignment between the through-holes required for supplying the refrigerant can be minimized, thereby reducing the possibility of refrigerant leakage.

Meanwhile, the opening/closing member 900a according to the present embodiment opens or cuts off the connection pipe 713 in response to the temperature of the refrigerant. Specifically, the opening/closing member 900a may include a shape memory alloy and respond to the temperature of the refrigerant, and may adjust the opening and closing of the second opening 712. In addition, by adjusting the degree of opening and closing, the flow rate of the refrigerant flowing through the heat sink 300 may be adjusted. At this time, the shape memory alloy is an alloy that is deformed at a transition temperature or less and has a property of returning to before deformation when exceeding the transition temperature.

Specifically, the opening/closing member 900a may include a cut-off part 910a for opening or cutting off the connection pipe 713, and a spring part 920a connected to the cut-off part 910a and including shape memory alloy. The cut-off part 910a may have a shape surrounding the outer peripheral surface of the body part 710 in which the second opening 712 is formed, and a spring-shaped spring part 920a may be connected under the cut-off part 910a.

The spring part 920a may include a shape memory alloy, and can be deformed in shape in response to the temperature of the refrigerant. In particular, the shape of the spring may expand or decrease in the vertical direction according to the temperature of the refrigerant. In response to the shape deformation of the spring part 920a, the cut-off part 910a may move up and down to open or cut off the connection pipe 713, particularly the second opening 712. As an example, FIG. 8 shows a state in which the spring part 920a reduces in the vertical direction and the cut-off part 910a moves downward to open the second opening 712. Meanwhile, FIG. 9 shows a state in which the spring part 920a extends in the vertical direction and the cut-off part 910a moves upward to cut off the second opening 712.

Meanwhile, as described above, the pack frame 1100 according to the present embodiment may include pack refrigerant pipes 1130 and 1140 and refrigerant openings 1150 and 1160 formed in the pack refrigerant pipes 1130 and 1140. At this time, the refrigerant openings 1150 and 1160 may include a stepped part 1150S for supporting one end of the spring part 920a. Referring to FIGS. 8 and 9, the refrigerant supply opening 1150 through which the refrigerant transfer bolt 700 passes may include a stepped part 1150S having a stepped structure. A spring portion 920a may be disposed on the upper surface of the stepped part 1150S. When the spring part 920a expands or decreases in the vertical direction according to the temperature of the refrigerant, it is supported by the stepped part 1150S, and thus the cut-off part 910a can be moved up and down.

The battery pack according to the present embodiment can actively adjust the supply and cutoff of the refrigerant according to the temperature of the refrigerant by applying the opening/closing member 900a using a shape memory alloy that responds to a predetermined temperature to the refrigerant transfer bolt 700, and the flow rate of the refrigerant can also be adjusted according to the degree of opening and closing. A refrigerant circulation system that adjusts the flow rate according to the temperature of the battery module can be easily formed without requiring a separate complicated adjusting device.

Meanwhile, the battery pack according to the present embodiment may further include a gasket 600 surrounding the body part 710 of the refrigerant transfer bolt 700. The gasket 600 may be located in at least one of between the head part 720 and the module frame extension part 211 and between the heat sink 300 and the pack frame 1100. Leakage of the refrigerant may be prevented through the gasket 600.

Meanwhile, although not specifically shown in the figure, the first mounting hole 211H, the second mounting hole 311H, and the refrigerant discharge opening 1160 of the pack frame 1100 can also be fastened by the refrigerant transfer bolt 700 according to the present embodiment. In other words, according to the present embodiment, the pack refrigerant pipes 1130 and 1140 can be connected to the heat sink 300 via the refrigerant transfer bolt 700, and the first mounting hole 211H, the second mounting hole 311H and the refrigerant transfer bolt 700 may be configured by a plurality of numbers. The refrigerant inflowing from the pack refrigerant supply pipe 1130 via any one of the second mounting holes 311H and the refrigerant transfer bolt 700 moves along the recessed part 340, and then can be discharged to the pack refrigerant discharge pipe 1140 via the other second mounting hole 311H and the refrigerant transfer bolt 700.

Meanwhile, referring to FIGS. 11a and 11b again, the spring part 920a according to the present embodiment may be a coil-shaped spring. Specifically, such a coil-shaped spring can be deformed by compression or the like in the vertical direction in response to the temperature of the refrigerant while surrounding the outer peripheral surface of the body part 710 of the refrigerant transfer bolt 700.

Meanwhile, FIGS. 12a and 12b are views of a refrigerant transfer bolt and an opening/closing member according to a modified embodiment of the present disclosure as viewed from various angles.

Referring to FIGS. 12a and 12b, the opening/closing member 900b according to the present embodiment may include a cut-off part 910b and a spring part 920b. At this time, the cut-off part 910b may be similar to or the same as the configuration described above, but the spring part 920b may be a plate-shaped spring. Specifically, the plurality of plate-shaped springs may be disposed to be spaced apart from each other at regular intervals along the cut-off part 910b, and may be deformed by compression or the like in the vertical direction in response to the temperature of the refrigerant.

The spring parts 920a and 920b according to the present embodiments as described above may be one exemplary structure, and the shape thereof is not particularly limited as long as the cut-off parts 910a and 910b can be moved in the vertical direction.

Next, the fixing method via the fixing bracket will be described in detail with reference to FIGS. 13 and 14.

FIG. 13 is a partial cross-sectional view taken along the cutting line C-C' of FIG. 6, and FIG. 14 is a partial cross-sectional view of a cross-section taken along the cutting line D-D' of FIG. 6.

Referring to FIGS. 4, 5, 13 and 14, protrusion parts 410 are formed on the front surface and rear surface of the battery module 100 according to the present embodiment, respectively. End plates 400 may be located on the front surface and rear surface of the battery module 100, wherein the protrusion part 410 may be formed on the end plate 400. Specifically, the protrusion part 410 may have a structure that protrudes in a direction perpendicular to the stacking direction of the battery cells 110 (a direction parallel to the y-axis). That is, the protrusion part 410 formed on the front surface of the battery module 100 may protrude in the y-axis direction, and the protrusion part 410 formed on the rear surface of the battery module 100 may protrude in the -y-axis direction.

Further, the protrusion part 410 may be formed at a lower edge of the front surface of the battery module 100 and a lower edge of the rear surface of the battery module 100, respectively. In addition, two protrusion parts 410 spaced apart from each other may be formed for each of the front surface and rear surface of the battery module 100.

The fixing bracket 500 may be coupled to the pack frame 1100 while surrounding the protrusion part 410. Specifically, the protrusion part 410 has an upper surface and three side surfaces as it is formed to protrude from the end plate 400. The fixing bracket 500 may include a fixing part 510 that wraps the upper surface and one side surface of the protrusion part 410. Furthermore, the fixing part 510 may further wrap the other two side surfaces of the protrusion part 410.

Meanwhile, a bracket hole 500H is formed in the fixing bracket 500, and a pack frame hole 1111H is formed in the pack frame 1100. The battery pack according to the present embodiment may include a bracket bolt B1 passing through a pack frame hole 1111H and a bracket hole 500H, and a bracket nut N1 coupling with a bracket bolt B1.

Specifically, the bracket hole 500H and the pack frame hole 1111H are located so as to correspond to each other, and the bracket bolt B1 may pass through the pack frame hole 1111H and the bracket hole 500H and can stand upright upward. After that, the bracket bolt B1 may be coupled to the bracket nut N1 to fix the fixing bracket 500 to the pack frame 1100. For effective fixing, it is preferable that the pack frame hole 1111H, the bracket hole 500H, the bracket bolt B1 and the bracket nut N1 are each configured by a plurality of numbers. In FIG. 4, the appearances that are respectively configured by four numbers are shown.

Since two fixing brackets 500 disposed to face each other with the battery module 100 interposed therebetween are coupled to the pack frame 1100 through the bracket bolt B1 and the bracket nut N1, while wrapping the protrusion part 410 of the battery module 100, the battery module 100 can be housed and fixed to the pack frame 1100.

Meanwhile, as shown in FIG. 13, the battery pack according to the present embodiment may further include an insulating member 800 located between the protrusion part 410 and the pack frame 1100. The insulating member 800 may be a pad-shaped member that exhibits electrical insulation. Galvanic corrosion may occur due to contact of dissimilar materials between the end plate 400 and the pack frame 1100, but the insulating member 800 can be disposed therebetween, thereby preventing the occurrence of galvanic corrosion.

Meanwhile, referring back to FIG. 6, the fixing bracket 500 according to the present embodiment may include a cover part 520 for covering the module frame extension part 211. Further, the fastening structure of the bracket bolt B1 and the bracket nut N1 may be respectively located on the left and right sides of the cover part 520. By forming the cover part 520 on the fixing bracket 500 fixed with the bracket bolt B1 and the bracket nut N1, the module frame extension part 211 can be pressed. Therefore, the module frame extension part 211 and the heat sink extension part 311 are closely attached to each other, so that the possibility of refrigerant leakage therebetween can be reduced. In addition, the head part 720 of the refrigerant transfer bolt 700 may be sealed while being surrounded by the end plate 400, the module frame extension part 211 and the cover part 520. By sealing through the cover part 520, it is possible to cut off the leaked refrigerant from penetrating into surrounding parts. That is, the cover part 520 itself may perform a function of preventing leakage of the refrigerant.

The terms representing directions such as the front side, the rear side, the left side, the right side, the upper side, and the lower side have been used in embodiments of the present disclosure, but the terms used are provided simply for convenience of description and may become different according to the position of an object, the position of an observer, or the like.

The one or more battery modules according to embodiments of the present disclosure described above can be mounted together with various control and protection systems such as a battery management system (BMS) and a cooling system to form a battery pack.

The battery module or the battery pack can be applied to various devices. For example, it can be applied to vehicle means such as an electric bike, an electric vehicle, and a hybrid electric vehicle, and may be applied to various devices capable of using a secondary battery, without being limited thereto.

The present disclosure has been described in detail with reference to exemplary embodiments thereof, but the scope of the present disclosure is not limited thereto and modifications and improvements made by those skilled in the part by using the basic concept of the present disclosure, which are defined in the following claims, also belong to the scope of the present disclosure.

DESCRIPTION OF REFERENCE NUMERALS

100: battery module
200: module frame
211: module frame extension part
300: heat sink
311: heat sink extension part
700: refrigerant transfer bolt
713: connection pipe
900a, 900b: opening/closing member
1100: pack frame

The invention claimed is:
1. A battery pack comprising:
a plurality of battery modules that comprises a battery cell stack, a module frame for housing the battery cell stack, and a heat sink located under a bottom part of the module frame;
a pack frame that houses the plurality of battery modules; and
a refrigerant transfer bolt that fastens the bottom part of the module frame, the heat sink, and the pack frame,
wherein the pack frame comprises a pack refrigerant pipe for supplying and discharging a refrigerant, wherein a connection pipe for connecting the pack refrigerant pipe and the heat sink is formed through the refrigerant transfer bolt, wherein the refrigerant transfer bolt includes an opening/closing member that opens or cuts off the connection pipe in response to a temperature of the refrigerant, and wherein:
the refrigerant transfer bolt comprises a first opening and a second opening connected to the connection pipe,
the first opening is disposed inside the pack refrigerant pipe,
the second opening is disposed between the bottom part of the module frame and the heat sink, and
the opening/closing member adjusts the opening/closing of the second opening in response to the temperature of the refrigerant.

2. The battery pack according to claim 1, wherein:
the opening/closing member comprises a shape memory alloy and deforms according to the temperature of the refrigerant.

3. The battery pack according to claim 1, wherein:
the opening/closing member comprises a cut-off part for opening or cutting-off the connection pipe and a spring part connected to the cut-off part and including a shape memory alloy.

4. The battery pack according to claim 3, wherein:
the spring part is deformed in shape in response to the temperature of the refrigerant, and
the cut-off part moves up and down according to the shape deformation of the spring part to open or cut off the connection pipe.

5. The battery pack according to claim 3, wherein:
the spring part is a coil-shaped spring or a plate-shaped spring.

6. The battery pack according to claim 3, wherein:
a refrigerant opening is formed in the pack frame, and
the refrigerant opening comprises a stepped part for supporting one end of the spring part.

7. The battery pack according to claim 1, wherein:
the module frame includes a module frame extension part formed by extending a part of the bottom part of the module frame,
the heat sink includes a heat sink extension part extending from one side of the heat sink to a portion where the module frame extension part is located, and
the refrigerant transfer bolt fastens the module frame extension part, the heat sink extension part, and the pack frame.

8. The battery pack according to claim 7, wherein:
the refrigerant opening is formed in the pack frame,
a first mounting hole is formed in the module frame extension part,
a second mounting hole is formed in the heat sink extension part, and
the refrigerant transfer bolt passes through the first mounting hole, the second mounting hole, and the refrigerant opening.

9. The battery pack according to claim 1, wherein:
the refrigerant transfer bolt comprises a body part in which the connection pipe is formed and a head part located at an upper end of the body part.

10. The battery pack according to claim 9, wherein:
the battery pack further comprises a gasket surrounding the body part, and
the gasket is located in at least one of between the head part and the a module frame extension part formed by extending a part of the bottom part of the module frame and between the heat sink and the pack frame.

11. The battery pack according to claim 1, wherein:
protrusion parts are formed on a front surface and a rear surface of the battery module, respectively, and
the battery pack further comprises a fixing bracket that is located on the front surface and the rear surface of the battery module, respectively, and is coupled to the pack frame while wrapping the protrusion part.

12. The battery pack according to claim 1, wherein:
the pack frame comprises a support frame for supporting the battery module and a lower frame located below the support frame, and
the pack refrigerant pipe is located between the support frame and the lower frame.

13. A device comprising the battery pack as set forth in claim 1.

14. The device according to claim 13, wherein the device is one of an electronic device including a mobile phone, a notebook computer, and a camcorder, a digital camera, and a vehicle including an electric bike, an electric vehicle, and a hybrid electric vehicle.

15. The battery pack according to claim 1, wherein:
the battery cell stack includes a plurality of battery cells that are stacked together.

16. A battery pack comprising:
a plurality of battery modules that comprises a battery cell stack, a module frame for housing the battery cell stack, and a heat sink located under a bottom part of the module frame;
a pack frame that houses the plurality of battery modules; and
a refrigerant transfer bolt that fastens the bottom part of the module frame, the heat sink, and the pack frame,
wherein the pack frame comprises a pack refrigerant pipe for supplying and discharging a refrigerant,
wherein a connection pipe for connecting the pack refrigerant pipe and the heat sink is formed through the refrigerant transfer bolt,
wherein the refrigerant transfer bolt includes an opening/closing member that opens or cuts off the connection pipe in response to a temperature of the refrigerant, and
wherein:
the refrigerant transfer bolt comprises a first opening and a second opening connected to the connection pipe,
the first opening is disposed inside the pack refrigerant pipe,
the second opening is disposed between the bottom part of the module frame and the heat sink,
an opening direction of the first opening is parallel to a penetrating direction of the connection pipe, and
an opening direction of the second opening is perpendicular to a penetrating direction of the connection pipe.

17. A battery pack comprising:
a plurality of battery modules that comprises a battery cell stack, a module frame for housing the battery cell stack, and a heat sink located under a bottom part of the module frame;
a pack frame that houses the plurality of battery modules; and
a refrigerant transfer bolt that fastens the bottom part of the module frame, the heat sink, and the pack frame,
wherein the pack frame comprises a pack refrigerant pipe for supplying and discharging a refrigerant, wherein a connection pipe for connecting the pack refrigerant pipe and the heat sink is formed through the refrigerant transfer bolt, and wherein the refrigerant transfer bolt includes an opening/closing member that opens or cuts off the connection pipe in response to a temperature of the refrigerant, and wherein:
   the pack frame comprises a support frame for supporting the battery module and a lower frame located below the support frame, and
   the pack refrigerant pipe is located between the support frame and the lower frame.

\* \* \* \* \*